United States Patent
Liang et al.

(10) Patent No.: US 12,300,785 B2
(45) Date of Patent: May 13, 2025

(54) SECONDARY BATTERY AND APPARATUS CONTAINING THE SECONDARY BATTERY

(71) Applicant: CONTEMPORARY AMPEREX TECHNOLOGY (HONG KONG) LIMITED, Hong Kong (CN)

(72) Inventors: Chengdu Liang, Ningde (CN); Zeli Wu, Ningde (CN); Peipei Chen, Ningde (CN); Chenghua Fu, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 528 days.

(21) Appl. No.: 17/550,934

(22) Filed: Dec. 14, 2021

(65) Prior Publication Data

US 2022/0109190 A1     Apr. 7, 2022

Related U.S. Application Data

(63) Continuation of application No. PCT/CN2019/127976, filed on Dec. 24, 2019.

(51) Int. Cl.
*H01M 10/0568* (2010.01)
*H01M 4/02* (2006.01)
(Continued)

(52) U.S. Cl.
CPC ....... *H01M 10/0568* (2013.01); *H01M 4/386* (2013.01); *H01M 4/505* (2013.01);
(Continued)

(58) Field of Classification Search
CPC ......... H01M 10/0568; H01M 10/0525; H01M 10/0567; H01M 10/0569; H01M 4/386; H01M 4/505; H01M 4/525; H01M 4/587
See application file for complete search history.

(56) References Cited

U.S. PATENT DOCUMENTS 10,978,740 B2 * 4/2021 Mizuno ............ H01M 10/0569
2012/0258357 A1 10/2012 Kim
(Continued)

FOREIGN PATENT DOCUMENTS

| CN | 104781975 A | 7/2015 |
|---|---|---|
| CN | 104969403 A | 10/2015 |

(Continued)

OTHER PUBLICATIONS

The European Patent Office (EPO) Extended Search Report for EP Application No. 19958003.6 Apr. 7, 2022 10 Pages.
(Continued)

*Primary Examiner* — Karie O'neill Apicella
(74) *Attorney, Agent, or Firm* — ANOVA LAW GROUP, PLLC

(57) ABSTRACT

This application provides a secondary battery and an apparatus containing the secondary battery. The secondary battery includes an electrolytic solution. The electrolytic solution includes an electrolyte salt and an organic solvent. The electrolyte salt includes lithium bis(fluorosulfonyl)imide (LiFSI) and lithium hexafluorophosphate ($LiPF_6$). A volumetric molar concentration of the LiFSI in the electrolytic solution is 0.8 mol/L-1.2 mol/L; and a volumetric molar concentration of the $LiPF_6$ in the electrolytic solution is 0.15 mol/L-0.4 mol/L. The organic solvent includes ethylene carbonate (EC), and mass percent of the EC in the organic solvent is less than or equal to 20%.

13 Claims, 5 Drawing Sheets

(51) Int. Cl.
  *H01M 4/38*      (2006.01)
  *H01M 4/505*     (2010.01)
  *H01M 4/525*     (2010.01)
  *H01M 4/587*     (2010.01)
  *H01M 10/0525*   (2010.01)
  *H01M 10/0567*   (2010.01)
  *H01M 10/0569*   (2010.01)

(52) U.S. Cl.
  CPC ........... *H01M 4/525* (2013.01); *H01M 4/587* (2013.01); *H01M 10/0525* (2013.01); *H01M 10/0567* (2013.01); *H01M 10/0569* (2013.01); *H01M 2004/027* (2013.01); *H01M 2004/028* (2013.01); *H01M 2220/20* (2013.01); *H01M 2300/0037* (2013.01)

(56) References Cited

U.S. PATENT DOCUMENTS

| | | |
|---|---|---|
| 2014/0272605 A1 | 9/2014 | Lim et al. |
| 2014/0342241 A1* | 11/2014 | Lim .................. H01M 4/525 429/331 |
| 2015/0249269 A1 | 9/2015 | Yoon et al. |
| 2019/0123390 A1 | 4/2019 | Xu et al. |
| 2019/0393554 A1 | 12/2019 | Noguchi et al. |
| 2020/0168955 A1 | 5/2020 | Shimanuki et al. |

FOREIGN PATENT DOCUMENTS

| | | | | |
|---|---|---|---|---|
| CN | 104995785 A | | 10/2015 | |
| CN | 107579280 A | | 1/2018 | |
| CN | 109473718 A | * | 3/2019 | ........ H01M 10/0525 |
| CN | 110036521 A | | 7/2019 | |
| CN | 110168797 A | | 8/2019 | |
| CN | 110352527 A | | 10/2019 | |
| CN | 110970662 A | | 4/2020 | |
| CN | 111886744 A | | 11/2020 | |
| CN | 111954952 A | | 11/2020 | |
| EP | 2958183 A1 | | 12/2015 | |
| EP | 2978059 A1 | | 1/2016 | |
| EP | 3528332 A2 | | 8/2019 | |
| EP | 3598557 A1 | | 1/2020 | |
| EP | 3780234 A1 | | 2/2021 | |
| EP | 3836279 A1 | | 6/2021 | |
| JP | 2019186012 A | | 10/2019 | |
| KR | 20140135659 A | | 11/2014 | |
| KR | 20150120393 A | | 10/2015 | |
| KR | 20170038543 A | | 4/2017 | |
| KR | 20180106971 A | | 10/2018 | |
| KR | 20190105096 A | | 9/2019 | |
| WO | 2014126256 A1 | | 8/2014 | |
| WO | 2018101391 A1 | | 6/2018 | |
| WO | 2018169029 A1 | | 9/2018 | |
| WO | 2018212276 A1 | | 11/2018 | |
| WO | 2018221346 A1 | | 12/2018 | |
| WO | 2019122314 A1 | | 6/2019 | |
| WO | 2019198716 A1 | | 10/2019 | |

OTHER PUBLICATIONS

The World Intellectual Property Organization (WIPO) International Search Report and written opinion for PCT/CN2019/127976 Aug. 26, 2020 16 pages (including English translation).

The European Patent Office (EPO) Intention to grant for EP Application No. 19958003.6 Feb. 14, 2023 5 Pages.

The European Patent Office (EPO) Communication pursuant to Article 94(3) for EP Application No. 19958003.6 Oct. 17, 2022 5 Pages.

Japan Patent Office (JPO) The Notice of Reasons for refusal For JP Application No. 2022-522047 May 25, 2023 7 Pages (Translation Included).

Korean Intellectual Property Office (KIPO) The Request for the Submission of an Opinion For KR Application No. 10-2022-7012242 Jul. 11, 2023 11 Pages (Translation Included).

Intellectual Property India The Examination report for IN Application No. 202217033361 Sep. 27, 2022 5 Pages (Translation Included).

China National Intellectual Property Administration (CNIPA) Notice of Grant of Invention Patent Right for Application No. 201980098832.2 Sep. 12, 2023 14 Pages (including translation).

Korean Intellectual Property Office (KIPO) The Office Action for KR Application No. 10-2022-7012242 Sep. 18, 2023 6 Pages (Translation Included).

The Japan Patent Office (JPO) Decision to Grant a Patent for Application No. 2022-522047 Oct. 24, 2023. 4 Pages (including translation).

* cited by examiner

SECONDARY BATTERY AND APPARATUS CONTAINING THE SECONDARY BATTERY

CROSS-REFERENCE TO RELATED APPLICATIONS

This application is a continuation application of PCT Patent Application No. PCT/CN2019/127976, entitled "SECONDARY BATTERY AND DEVICE COMPRISING THE SECONDARY BATTERY" filed on Dec. 24, 2019, which is incorporated herein by reference in its entirety.

TECHNICAL FIELD

This application relates to the technical field of batteries, and in particular, to a secondary battery and an apparatus containing the secondary battery.

BACKGROUND

With the increase of depletion of fossil energy and environmental pollution pressure, new energy vehicles have been valued and developed unprecedentedly. Secondary batteries are widely applied due to a high energy density, a high operating voltage, no memory effect, and other characteristics.

Customers of the secondary batteries applied to electric vehicles are posing higher requirements on the long-term reliability and cruising range of the batteries.

Therefore, to meet the performance requirements of new energy vehicles for power energy, it is necessary to provide a secondary battery of superior overall performance.

SUMMARY

In view of problems in background, this application provides a secondary battery and an apparatus that contains the secondary battery. The secondary battery achieves good high-temperature cycle performance and good high-temperature storage performance while keeping a high energy density at the same time.

To achieve the foregoing objective, a first aspect of this application provides a secondary battery. The secondary battery includes an electrolytic solution. The electrolytic solution includes an electrolyte salt and an organic solvent. The electrolyte salt includes lithium bis(fluorosulfonyl)imide (LiFSI) and lithium hexafluorophosphate (LiPF$_6$). A volumetric molar concentration of the LiFSI in the electrolytic solution is 0.8 mol/L-1.2 mol/L; and a volumetric molar concentration of the LiPF$_6$ in the electrolytic solution is 0.15 mol/L-0.4 mol/L. The organic solvent includes ethylene carbonate (EC), and mass percent of the EC in the organic solvent is less than or equal to 20%.

A second aspect of this application provides an apparatus including the secondary battery according to the first aspect of this application.

Some exemplary embodiments of the present application are provided as follows.

In some embodiments, the volumetric molar concentration of the LiFSI in the electrolytic solution is 0.9 mol/L-1.2 mol/L.

In some embodiments, the volumetric molar concentration of the LiPF$_6$ in the electrolytic solution is 0.15 mol/L-0.3 mol/L.

In some embodiments, a ratio of the volumetric molar concentration of the LiFSI to the LiPF$_6$ is 3-7:1, exemplarily 4-6:1.

In some embodiments, the mass percent of the EC in the organic solvent is less than or equal to 15%, and exemplarily the mass percent of the EC in the organic solvent is less than or equal to 10%.

In some embodiments, the organic solvent further comprises one or more of dimethyl carbonate (DMC), diethyl carbonate (DEC), or ethyl methyl carbonate (EMC).

In some embodiments, the organic solvent further comprises the EMC, and a mass percent of the EMC in the organic solvent is 60%-95%, exemplarily 75%-95%.

In some embodiments, the electrolytic solution further comprises an additive, and the additive comprises one or more of fluoroethylene carbonate (FEC), ethylene sulfate (DTD), 1,3-propane sultone (PS), 1,3-propenyl-sultone (PST), succinic anhydride (SA), lithium difluorooxalate borate (LiDFOB), lithium difluorobisoxalate phosphate (LiDFOP), tris(trimethylsilyl) phosphate (TMSP), or tris(trimethylsilyl) borate (TMSB).

In some embodiments, a conductivity of the electrolytic solution at 25° C. is 6.5 mS/cm-9.5 mS/cm, and exemplarily, the conductivity of the electrolytic solution at 25° C. is 7.0 mS/cm-9.0 mS/cm.

In some embodiments, a volumetric molar concentration of the electrolyte salt in the electrolytic solution is 1.0 mol/L-1.4 mol/L, exemplarily, 1.1 mol/L-1.3 mol/L.

In some embodiments, the secondary battery comprises a negative electrode plate, the negative electrode plate comprises a negative electrode current collector and a negative electrode membrane that is disposed on at least one surface of the negative electrode current collector and that comprises a negative electrode active material, and the negative electrode active material comprises a carbon material or a silicon-based material or both thereof.

In some embodiments, the negative electrode active material comprises the silicon-based material, and a weight percent of the silicon-based material in the negative electrode active material is less than or equal to 40%, and exemplarily the weight percent of the silicon-based material in the negative electrode active material is 15%-30%.

In some embodiments, the secondary battery comprises a positive electrode plate, the positive electrode plate comprises a positive electrode current collector and a positive electrode membrane that is disposed on at least one surface of the positive electrode current collector and that comprises a positive electrode active material, and the positive electrode active material comprises a lithium nickel cobalt manganese oxide or a lithium nickel cobalt aluminum oxide or both thereof, and exemplarily, the positive electrode active material comprises a compound whose general formula is $Li_aNi_bCo_cM_dM'_eO_fA_g$ or a $Li_aNi_bCo_cM_dM'_eO_fA_g$ compound whose surface is at least partially coated with a coating layer, or both thereof, wherein $0.8 \leq a \leq 1.2$, $0.5 \leq b < 1$, $0 < c < 1$, $0 < d < 1$, $0 \leq e \leq 0.1$, $1 \leq f \leq 2$, and $0 \leq g \leq 1$; M is Mn or Al or both thereof, M' is selected from one or more of Zr, Al, Zn, Cu, Cr, Mg, Fe, V, Ti, or B; and A is selected from one or more of N, F, S, or Cl.

In some embodiments, the positive electrode active material further comprises one or more of a lithium nickel oxide, a lithium manganese oxide, a lithium iron phosphate, a lithium manganese phosphate, a lithium iron manganese phosphate, a lithium cobalt oxide, or a modified compound thereof.

This application achieves at least the following beneficial effects:

In the secondary battery according to this application, the electrolyte salt in the electrolytic solution includes a specific content of both LiFSI and LiPF$_6$, and the organic solvent includes a specific content of EC, so that the secondary battery achieves good high-temperature cycle performance and good high-temperature storage performance at the same time. The apparatus according to this application includes the secondary battery, and therefore, has at least the same advantages as the secondary battery.

Figure 1:
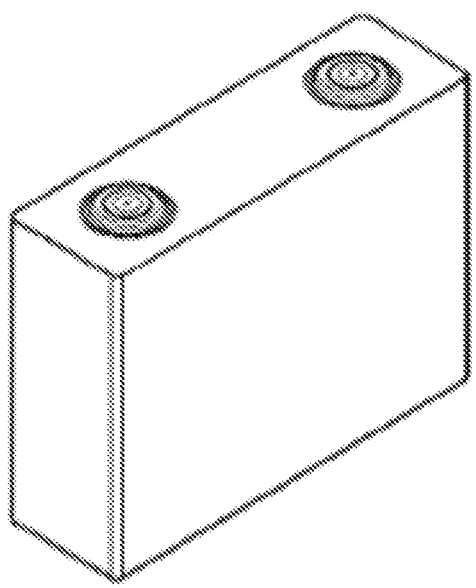
FIG. 1 is a schematic diagram of an implementation of a secondary battery.

Reference numerals are as follows:
1: Battery pack;
2: Upper box body;
3: Lower box body;
4: Battery module; and
5: Secondary battery.

DESCRIPTION OF EMBODIMENTS

The following describes in detail a secondary battery and an apparatus containing the secondary battery according to this application.

A first aspect of this application provides a secondary battery. The secondary battery includes an electrolytic solution. The electrolytic solution includes an electrolyte salt and an organic solvent. The electrolyte salt includes lithium bis(fluorosulfonyl)imide (LiFSI) and lithium hexafluorophosphate ($LiPF_6$). A volumetric molar concentration of the LiFSI in the electrolytic solution is 0.8 mol/L-1.2 mol/L; and a volumetric molar concentration of the $LiPF_6$ in the electrolytic solution is 0.15 mol/L-0.4 mol/L. The organic solvent includes ethylene carbonate (EC), and a mass percent of the EC in the organic solvent is less than or equal to 20%.

Through a large amount of studies, the inventor finds that in the secondary battery according to the first aspect of this application, the secondary battery exhibits good high-temperature cycle performance and good high-temperature storage performance under common effects of the following conditions that are all satisfied by the electrolytic solution: the electrolyte salt includes the LiFSI and the $LiPF_6$; the volumetric molar concentration of the LiFSI in the electrolytic solution is 0.8 mol/L-1.2 mol/L; the volumetric molar concentration of the $LiPF_6$ in the electrolytic solution is 0.1 mol/L-0.4 mol/L; the organic solvent includes the EC; and the mass percent of the EC in the organic solvent is less than or equal to 20%.

As inferred by the inventor, a possible reason for such beneficial effects is that when the LiFSI and the $LiPF_6$ are used together in the electrolyte salt and the volumetric molar concentration of the LiFSI and the $LiPF_6$ are controlled to be within a specific range, the advantages of the LiFSI complement the advantages of the $LiPF_6$ to effectively mitigate an impact caused by oxidation of the LiFSI at a positive electrode onto the cycle performance of the secondary battery. In addition, on the basis of the mixed electrolyte salt, the organic solvent further includes a specific content of the EC, thereby well dissociating the mixed electrolyte salt and also further improving the high-temperature storage performance of the battery.

In the secondary battery according to the first aspect of this application, exemplarily, the volumetric molar concentration of the LiFSI in the electrolytic solution is 0.9 mol/L-1.2 mol/L. When the volumetric molar concentration of the LiFSI in the electrolytic solution falls within such a range, the high-temperature storage performance of the battery is further improved.

In the secondary battery according to the first aspect of this application, exemplarily, the volumetric molar concentration of the $LiPF_6$ in the electrolytic solution is 0.15 mol/L-0.3 mol/L. When the volumetric molar concentration of the $LiPF_6$ in the electrolytic solution falls within such a range, the high-temperature cycle performance of the battery is further improved.

In the secondary battery according to the first aspect of this application, exemplarily, mass percent of the EC in the organic solvent is less than or equal to 15%. If the content of the EC is too high, a solid electrolyte interphase (SEI) film formed by a decomposition product of the EC on a surface of a negative electrode will be too thick, thereby deteriorating a direct-current resistance of the secondary battery to a certain extent. Desirably, the mass percent of the EC in the organic solvent is less than or equal to 10%.

In the secondary battery according to the first aspect of this application, exemplarily a ratio of the volumetric molar concentration of LiFSI to $LiPF_6$ is 3-7:1. When the ratio of the volumetric molar concentration of LiFSI to $LiPF_6$ is controlled to be in the given range, a better synergistic effect can be exerted between the LiFSI and the $LiPF_6$ to further improve the high-temperature cycle performance and the high-temperature storage performance of the secondary battery. Desirably, the ratio of the volumetric molar concentration of LiFSI to $LiPF_6$ is 4-6:1.

In the secondary battery according to the first aspect of this application, further, the organic solvent also includes one or more of dimethyl carbonate (DMC), diethyl carbonate (DEC), or ethyl methyl carbonate (EMC).

In the secondary battery according to the first aspect of this application, exemplarily, the organic solvent further includes the EMC, and mass percent of the EMC in the organic solvent is 60%-95%, desirably 75%-95%.

In the secondary battery according to the first aspect of this application, the electrolytic solution further includes an additive. Exemplarily, the additive includes one or more of fluoroethylene carbonate (FEC), ethylene sulfate (DTD), 1,3-propane sultone (PS), 1,3-propenyl-sultone (PST), succinic anhydride (SA), lithium difluorooxalate borate (LiDFOB), lithium difluorobisoxalate phosphate (LiDFOP), tris (trimethylsilyl) phosphate (TMSP), or tris(trimethylsilyl) borate (TMSB).

In the secondary battery according to the first aspect of this application, exemplarily, a conductivity of the electrolytic solution at 25° C. is 6.5 mS/cm-9.5 mS/cm. Desirably, the conductivity of the electrolytic solution at 25° C. is 7.0 mS/cm-9.0 mS/cm.

The conductivity of the electrolytic solution at 25° C. may be measured by a known method in the art, and may be measured by using a Leici conductivity meter.

In the secondary battery according to the first aspect of this application, exemplarily, a volumetric molar concentration of the electrolyte salt in the electrolytic solution is 0.9 mol/L-1.1 mol/L.

In the secondary battery according to the first aspect of this application, the secondary battery further includes a negative electrode plate. The negative electrode plate includes a negative electrode current collector and a negative electrode membrane that is disposed on at least one surface of the negative electrode current collector and that includes a negative electrode active material.

In the secondary battery according to the first aspect of this application, the type of the negative electrode current collector is not limited, and may be selected according to actual needs. Specifically, the negative electrode current collector may be a metal foil such as a copper foil.

In the secondary battery according to the first aspect of this application, exemplarily, the negative electrode active material includes a carbon material or a silicon-based material or both thereof.

In the secondary battery according to the first aspect of this application, the carbon material may include one or more of graphite, soft carbon, or hard carbon. Desirably, the carbon material includes graphite, and the graphite is artificial graphite or natural graphite or both thereof.

In the secondary battery according to the first aspect of this application, the silicon-based material may include one or more of elemental silicon, a silicon alloy, a silicon-oxygen compound, a silicon-carbon composite, or a silicon-nitrogen compound. Exemplarily, the silicon-based material includes a silicon-oxygen compound.

In the secondary battery according to the first aspect of this application, when the negative electrode active material includes the silicon-based material, exemplarily a weight percent of the silicon-based material in the negative electrode active material is less than or equal to 40%, and desirably the weight percent of the silicon-based material in the negative electrode active material is 15%-30%.

In the secondary battery according to the first aspect of this application, the secondary battery further includes a positive electrode plate. The positive electrode plate includes a positive electrode current collector and a positive electrode membrane that is disposed on at least one surface of the positive electrode current collector and that includes a positive electrode active material.

In the secondary battery according to the first aspect of this application, the type of the positive electrode current collector is not limited, and may be selected according to actual needs. Specifically, the positive electrode current collector may be a metal foil such as an aluminum foil.

In the secondary battery according to the first aspect of this application, exemplarily, the positive electrode active material includes a lithium nickel cobalt manganese oxide or a lithium nickel cobalt aluminum oxide or both thereof. The lithium nickel cobalt manganese oxide and the lithium nickel cobalt aluminum oxide serving as positive electrode active materials of the secondary battery have the advantages of a high specific capacity and a long cycle life.

In the secondary battery according to the first aspect of this application, exemplarily, the positive electrode active material includes a compound whose general formula is $Li_aNi_bCo_cM_dM'_eO_fA_g$ or a $Li_aNi_bCo_cM_dM'_eO_fA_g$ material whose surface is at least partially coated with a coating layer, or both thereof, where $0.8 \leq a \leq 1.2$, $0.5 \leq b < 1$, $0 < c < 1$, $0 < d < 1$, $0 \leq e \leq 0.1$, $1 \leq f \leq 2$, and $0 \leq g \leq 1$; M is Mn or Al or both thereof; M' is selected from one or more of Zr, Al, Zn, Cu, Cr, Mg, Fe, V, Ti, or B; and A is selected from one or more of N, F, S, or Cl.

A coating layer on the surface of the positive electrode active material may be a carbon layer, an oxide layer, an inorganic salt layer, or a conductive polymer layer. The cycle performance of the secondary battery can be further improved by surface modification on the coating of the positive electrode active material.

In the secondary battery according to the first aspect of this application, further, the positive electrode active material may include one or more of a lithium nickel oxide (such as a lithium nickel oxide), a lithium manganese oxide (such as a spinel-type lithium manganate oxide or a laminated lithium manganate oxide), a lithium iron phosphate, a lithium manganese phosphate, a lithium manganese iron phosphate, a lithium cobalt oxide, or a modified compound thereof.

In the secondary battery according to the first aspect of this application, the secondary battery further includes a separator. The type of the separator is not limited, and may be any of various separators applicable to a lithium-ion battery in the art. Specifically, the separator may be selected from a polyethylene film, a polypropylene film, a polyvinylidene fluoride film, or a multilayer composite film thereof.

In some embodiments, the secondary battery may include an outer package configured to package the positive electrode plate, the negative electrode plate, and the electrolytic solution. For example, the positive electrode plate, the negative electrode plate, and the separator may be laminated to form a laminated electrode assembly or may be wound to form a wound electrode assembly. The electrode assembly is packaged in an outer package, and the electrolytic solution infiltrates the electrode assembly. The quantity of electrode assemblies in the secondary battery may be one or more, and is adjustable according to needs.

In some embodiments, the outer package of the secondary battery may be a soft package such as a pouch-type soft package. The material of the soft package may be plastic such as one or more of polypropylene (PP), polybutylene terephthalate (PBT), or polybutylene succinate (PBS). The outer package of the secondary battery may also be a hard casing such as an aluminum casing.

The shape of the secondary battery is not limited in this application, and may be cylindrical, prismatic or of any other shape. FIG. 1 shows a prismatic secondary battery 5 as an example.

In some embodiments, the secondary battery may be assembled into a battery module. The battery module may contain a plurality of secondary batteries, and the specific quantity of the secondary batteries in a battery module may be adjusted according to the application and capacity of the battery module.

Figure 2:
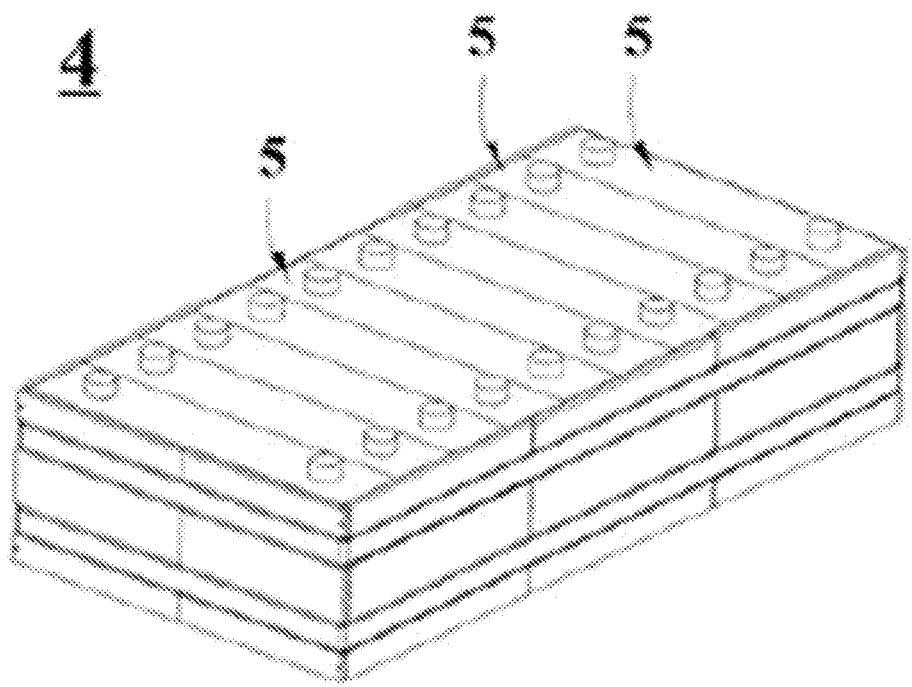
FIG. 2 is a schematic diagram of an implementation of a battery module.

FIG. 2 shows a battery module 4 as an example. Referring to FIG. 2, in the battery module 4, a plurality of secondary batteries 5 may be arranged sequentially along a length direction of the battery module 4. Nevertheless, the secondary batteries may also be arranged in any other manner. Further, the plurality of secondary batteries 5 may be fixed by fasteners.

In some embodiments, the battery module 4 may further include a housing that provides an accommodation space. A plurality of secondary batteries 5 are accommodated in the accommodation space.

In some embodiments, the battery module may be assembled into a battery pack. The quantity of the battery modules contained in a battery pack may be adjusted according to the application and capacity of the battery pack.

Figure 3:
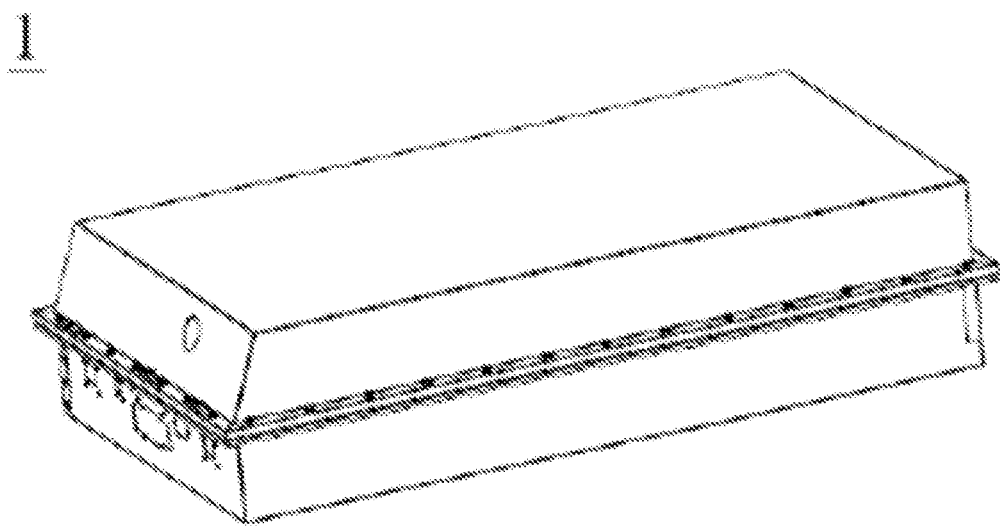
FIG. 3 is a schematic diagram of an implementation of a battery pack.
Figure 4:
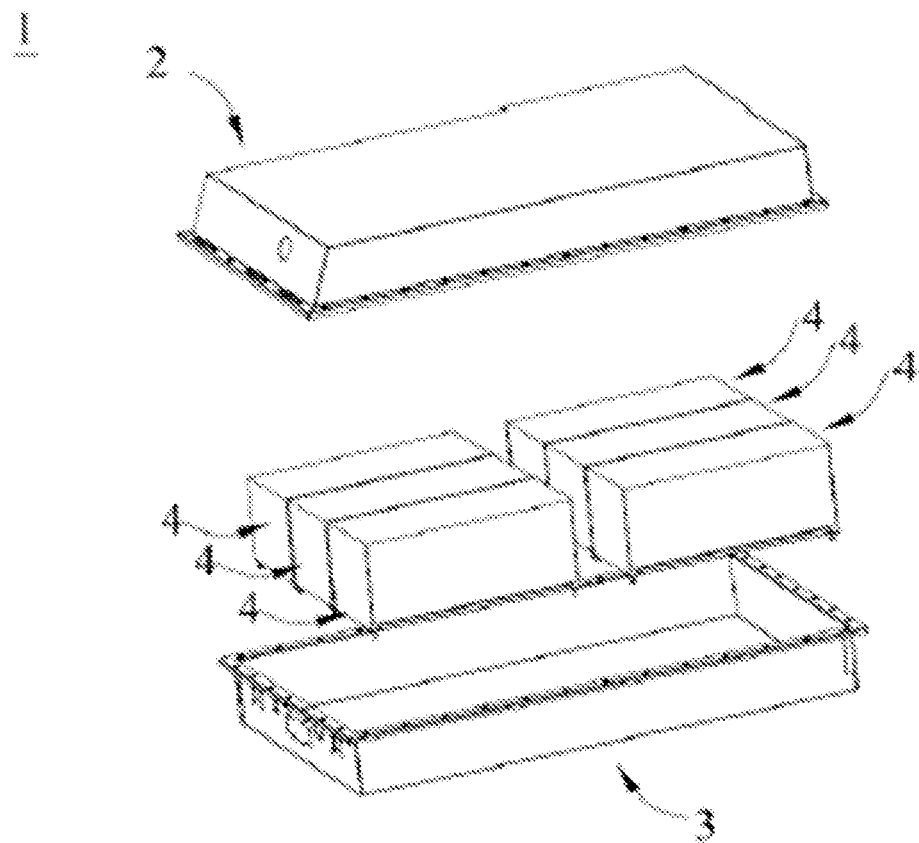
FIG. 4 is an exploded view of FIG. 3.

FIG. 3 and FIG. 4 shows a battery pack 1 as an example. Referring to FIG. 3 and FIG. 4, the battery pack 1 may include a battery casing and a plurality of battery modules 4 contained in the battery casing. The battery casing includes an upper box body 2 and a lower box body 3. The upper box body 2 engages with the lower box body 3 to form a closed space for accommodating the battery module 4. The plurality of battery modules 4 may be arranged in the battery casing in any manner.

A second aspect of this application provides an apparatus including the secondary battery according to the first aspect of this application. The secondary battery may be used as a power supply to the apparatus, or as an energy storage unit of the apparatus. The apparatus includes, but is not limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

A secondary battery, a battery module, or a battery pack may be selected for the apparatus according to use requirements of the apparatus.

Figure 5:
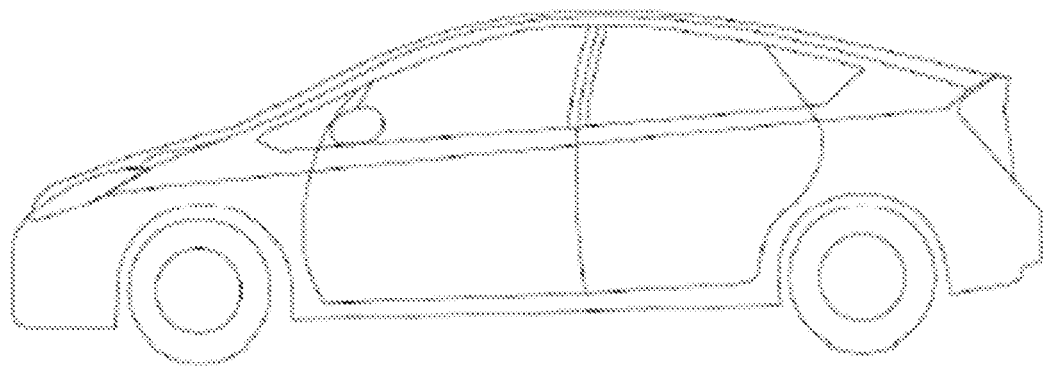
FIG. 5 is a schematic diagram of an implementation of an apparatus using a secondary battery as a power supply.

FIG. 5 shows an apparatus as an example. The apparatus may be battery electric vehicle, a hybrid electric vehicle, a plug-in hybrid electric vehicle, or the like. To meet the requirements of the apparatus for a high energy density of the secondary battery, a battery pack or a battery module may be adopted.

The apparatus used as another example may be a mobile phone, a tablet computer, a notebook computer, or the like. The apparatus is generally required to be thin and light, and may have a secondary battery as a power supply.

This application is further described below with reference to embodiments. Understandably, the embodiments are only intended to illustrate this application but not to limit the scope of this application.

The secondary batteries in Embodiments 1-24 and Comparative Embodiments 1-7 are prepared using the following method:

(1) Preparing a Positive Electrode Plate

Mixing a positive electrode active material (LiNi$_{0.8}$Co$_{0.1}$Mn$_{0.1}$O$_2$), a binder (polyvinylidene fluoride), and a conductive agent (Super P) at a weight ratio of 98:1:1, and adding the mixture into an N-methyl-pyrrolidone (NMP) solvent system; stirring the mixture with a vacuum mixer until the system becomes homogeneous and transparent so that a positive electrode slurry is obtained; coating an aluminum foil with the positive electrode slurry homogeneously; drying the aluminum foil in the air under a room temperature, and moving the aluminum foil into an oven for drying, and then performing cold calendering and slitting to obtain a positive electrode plate.

(2) Preparing a Negative Electrode Plate

Mixing a negative electrode active material (artificial graphite), a conductive agent (Super P), and a binder (styrene butadiene rubber (SBR)) at a mass ratio of 96:2:2, and then adding the mixture into deionized water; stirring the mixture with a vacuum mixer to obtain a negative electrode slurry; coating a copper foil of the negative electrode current collector with the negative electrode slurry homogeneously; drying the copper foil in the air under a room temperature, and moving the copper foil into an oven for drying, and then performing cold calendering and slitting to obtain a negative electrode plate.

(3) Preparing an Electrolytic Solution

Mixing organic solvents in an argon atmosphere glovebox with a water content of less than 10 ppm, then dissolving a fully dried electrolyte salt in the organic solvents, and then adding additives (0.5 wt % FEC and 1 wt % DTD) into the organic solvents; and mixing the solution homogeneously to obtain an electrolytic solution. The volumetric molar concentration of each electrolyte salt and the weight percent of each organic solvent are shown in Table 1. In Table 1, the volumetric molar concentration of each electrolyte salt is a volumetric molar concentration calculated based on a total volume of the electrolytic solution; and the content of each organic solvent is a weight percent calculated based on a total weight of the organic solvents. The content of each additive mentioned above is a weight percent calculated based on a total weight of the electrolytic solution.

(4) Preparing a Separator

Using a polyethylene film as a separator.

(5) Preparing a Secondary Battery

Sequentially stacking the positive electrode plate, the separator, and the negative electrode plate so that the separator is located between the positive electrode plate and the negative electrode plate for a purpose of separation, and then winding them to obtain an electrode assembly; placing the electrode assembly in an outer package, and injecting the electrolytic solution prepared above into the dried battery; then performing vacuum packaging, standing, formation, and reshaping to obtain a secondary battery.

The preparation methods of the secondary battery in Embodiments 2-24 and Comparative Embodiments 1-7 are similar to those in Embodiment 1 except a different mixing ratio of the electrolytic solution in the secondary battery in Embodiments 2-24 and Comparative Embodiments 1-7 (as detailed in Table 1).

The secondary batteries in Embodiments 25-48 and Comparative Embodiments 8-14 are prepared using the following method:

(1) Preparing a Positive Electrode Plate

Mixing a positive electrode active material (LiNi$_{0.8}$Co$_{0.1}$Mn$_{0.1}$O$_2$), a binder (polyvinylidene fluoride), and a conductive agent (Super P) at a weight ratio of 98:1:1, and adding the mixture into an N-methyl-pyrrolidone (NMP) solvent system; stirring the mixture with a vacuum mixer until the system becomes homogeneous and transparent so that a positive electrode slurry is obtained; coating an aluminum foil with the positive electrode slurry homogeneously; drying the aluminum foil in the air under a room temperature, and moving the aluminum foil into an oven for drying, and then performing cold calendering and slitting to obtain a positive electrode plate.

(2) Preparing a Negative Electrode Plate

Mixing a negative electrode active material (silicon suboxide) and artificial graphite at a mass ratio of 2:8, then mixing the mixture with a conductive agent (Super P) and a binder (acrylate) at a mass ratio of 92:2:6, and then adding the mixture into deionized water; stirring the mixture with a vacuum mixer to obtain a negative electrode slurry; coating a copper foil of the negative electrode current collector with the negative electrode slurry homogeneously; drying the copper foil in the air under a room temperature, and then moving the copper foil into an oven for drying, and then performing cold calendering and slitting to obtain a negative electrode plate.

(3) Preparing an Electrolytic Solution

Mixing organic solvents in an argon atmosphere glovebox with a water content of less than 10 ppm, then dissolving a fully dried electrolyte salt in the organic solvents, and then adding additives (8 wt % FEC, 1 wt % SA, 0.8 wt % TMSP) into the organic solvents; and mixing the solution homogeneously to obtain an electrolytic solution. The volumetric molar concentration of each electrolyte salt and the weight percent of each organic solvent are shown in Table 1. In Table 2, the volumetric molar concentration of each electrolyte salt is a volumetric molar concentration calculated based on a total volume of the electrolytic solution; and the content of each organic solvent is a weight percent calculated based on a total weight of the organic solvents. The content of each additive mentioned above is a weight percent calculated based on a total weight of the electrolytic solution.

(4) Preparing a Separator

Using a polyethylene film as a separator.

(5) Preparing a Secondary Battery

Sequentially stacking the positive electrode plate, the separator, and the negative electrode plate so that the separator is located between the positive electrode plate and the negative electrode plate for a purpose of separation, and then winding them to obtain an electrode assembly; placing the electrode assembly in an outer package, and injecting the electrolytic solution prepared above into the dried battery; then performing vacuum packaging, standing, formation, and reshaping to obtain a secondary battery.

The preparation methods of the secondary battery in Embodiments 26-48 and Comparative Embodiments 8-14 are similar to those in Embodiment 25 except a different mixing ratio of the electrolytic solution in the secondary battery in Embodiments 26-48 and Comparative Embodiments 8-14 (as detailed in Table 2).

TABLE 1

Parameters in Embodiments 1-24 and Comparative Embodiments 1-7

| Serial number | Organic solvent (wt %) | Electrolyte salt | | | | $LiFSI/LiPF_6$ (molar ratio) |
|---|---|---|---|---|---|---|
| | | Type | Content (mol/L) | Type | Content (mol/L) | |
| Embodiment 1 | EC:EMC = 5:95 | LiFSI | 0.8 | $LiPF_6$ | 0.2 | 4.0 |
| Embodiment 2 | EC:EMC = 5:95 | LiFSI | 0.85 | $LiPF_6$ | 0.2 | 4.3 |
| Embodiment 3 | EC:EMC = 5:95 | LiFSI | 0.9 | $LiPF_6$ | 0.2 | 4.5 |
| Embodiment 4 | EC:EMC = 5:95 | LiFSI | 1.0 | $LiPF_6$ | 0.2 | 5.0 |
| Embodiment 5 | EC:EMC = 5:95 | LiFSI | 1.05 | $LiPF_6$ | 0.2 | 5.3 |
| Embodiment 6 | EC:EMC = 5:95 | LiFSI | 1.1 | $LiPF_6$ | 0.2 | 5.5 |
| Embodiment 7 | EC:EMC = 5:95 | LiFSI | 1.2 | $LiPF_6$ | 0.2 | 6.0 |
| Embodiment 8 | EC:EMC = 5:95 | LiFSI | 1.2 | $LiPF_6$ | 0.15 | 8.0 |
| Embodiment 9 | EC:EMC = 5:95 | LiFSI | 1.1 | $LiPF_6$ | 0.15 | 7.3 |
| Embodiment 10 | EC:EMC = 5:95 | LiFSI | 1.1 | $LiPF_6$ | 0.25 | 4.4 |
| Embodiment 11 | EC:EMC = 5:95 | LiFSI | 1.1 | $LiPF_6$ | 0.3 | 3.7 |
| Embodiment 12 | EC:EMC = 5:95 | LiFSI | 1.05 | $LiPF_6$ | 0.15 | 7.0 |
| Embodiment 13 | EC:EMC = 5:95 | LiFSI | 1.05 | $LiPF_6$ | 0.25 | 4.2 |
| Embodiment 14 | EC:EMC = 5:95 | LiFSI | 1.05 | $LiPF_6$ | 0.3 | 3.5 |
| Embodiment 15 | EC:EMC = 5:95 | LiFSI | 1.05 | $LiPF_6$ | 0.35 | 3.0 |
| Embodiment 16 | EC:EMC = 5:95 | LiFSI | 0.9 | $LiPF_6$ | 0.15 | 6.0 |
| Embodiment 17 | EC:EMC = 5:95 | LiFSI | 0.9 | $LiPF_6$ | 0.25 | 3.6 |
| Embodiment 18 | EC:EMC = 5:95 | LiFSI | 0.9 | $LiPF_6$ | 0.3 | 3.0 |
| Embodiment 19 | EC:EMC = 5:95 | LiFSI | 0.9 | $LiPF_6$ | 0.35 | 2.6 |
| Embodiment 20 | EC:EMC = 5:95 | LiFSI | 0.9 | $LiPF_6$ | 0.4 | 2.3 |
| Embodiment 21 | EC:EMC:DEC = 20:60:20 | LiFSI | 1.1 | $LiPF_6$ | 0.2 | 5.5 |
| Embodiment 22 | EC:EMC:DEC = 15:65:20 | LiFSI | 1.1 | $LiPF_6$ | 0.2 | 5.5 |
| Embodiment 23 | EC:EMC = 10:90 | LiFSI | 1.1 | $LiPF_6$ | 0.2 | 5.5 |
| Embodiment 24 | EC:EMC:DMC = 5:85:10 | LiFSI | 1.1 | $LiPF_6$ | 0.2 | 5.5 |
| Comparative Embodiment 1 | EC:EMC:DMC = 30:50:20 | LiFSI | 1.1 | $LiPF_6$ | 0.2 | 5.5 |
| Comparative Embodiment 2 | EC:EMC = 30:70 | LiFSI | 1.1 | $LiPF_6$ | 0.2 | 5.5 |
| Comparative Embodiment 3 | EC:EMC = 5:95 | / | / | $LiPF_6$ | 1.2 | / |
| Comparative Embodiment 4 | EC:EMC = 5:95 | LiFSI | 0.5 | $LiPF_6$ | 0.8 | 0.6 |
| Comparative Embodiment 5 | EC:EMC = 5:95 | LiFSI | 1.25 | $LiPF_6$ | 0.15 | 8.3 |
| Comparative Embodiment 6 | EC:EMC = 5:95 | LiFSI | 1.2 | $LiPF_6$ | 0.1 | 12.0 |
| Comparative Embodiment 7 | EC:EMC = 5:95 | LiFSI | 0.8 | $LiPF_6$ | 0.5 | 1.6 |

TABLE 2

Parameters in Embodiments 25-48 and Comparative Embodiments 8-14

| Serial number | Organic solvent (wt %) | Electrolyte salt | | | | $LiFSI/LiPF_6$ (molar ratio) |
|---|---|---|---|---|---|---|
| | | Type | Content (mol/L) | Type | Content (mol/L) | |
| Embodiment 25 | EC:EMC = 5:95 | LiFSI | 0.8 | $LiPF_6$ | 0.2 | 4.0 |
| Embodiment 26 | EC:EMC = 5:95 | LiFSI | 0.85 | $LiPF_6$ | 0.2 | 4.3 |
| Embodiment 27 | EC:EMC = 5:95 | LiFSI | 0.9 | $LiPF_6$ | 0.2 | 4.5 |
| Embodiment 28 | EC:EMC = 5:95 | LiFSI | 1.0 | $LiPF_6$ | 0.2 | 5.0 |
| Embodiment 29 | EC:EMC = 5:95 | LiFSI | 1.05 | $LiPF_6$ | 0.2 | 5.3 |
| Embodiment 30 | EC:EMC = 5:95 | LiFSI | 1.1 | $LiPF_6$ | 0.2 | 5.5 |
| Embodiment 31 | EC:EMC = 5:95 | LiFSI | 1.2 | $LiPF_6$ | 0.2 | 6.0 |

TABLE 2-continued

Parameters in Embodiments 25-48 and Comparative Embodiments 8-14

| Serial number | Organic solvent (wt %) | Electrolyte salt Type | Content (mol/L) | Type | Content (mol/L) | LiFSI/LiPF$_6$ (molar ratio) |
|---|---|---|---|---|---|---|
| Embodiment 32 | EC:EMC = 5:95 | LiFSI | 1.2 | LiPF$_6$ | 0.15 | 8.0 |
| Embodiment 33 | EC:EMC = 5:95 | LiFSI | 1.1 | LiPF$_6$ | 0.15 | 7.3 |
| Embodiment 34 | EC:EMC = 5:95 | LiFSI | 1.1 | LiPF$_6$ | 0.25 | 4.4 |
| Embodiment 35 | EC:EMC = 5:95 | LiFSI | 1.1 | LiPF$_6$ | 0.3 | 3.7 |
| Embodiment 36 | EC:EMC = 5:95 | LiFSI | 1.05 | LiPF$_6$ | 0.15 | 7.0 |
| Embodiment 37 | EC:EMC = 5:95 | LiFSI | 1.05 | LiPF$_6$ | 0.25 | 4.2 |
| Embodiment 38 | EC:EMC = 5:95 | LiFSI | 1.05 | LiPF$_6$ | 0.3 | 3.5 |
| Embodiment 39 | EC:EMC = 5:95 | LiFSI | 1.05 | LiPF$_6$ | 0.35 | 3.0 |
| Embodiment 40 | EC:EMC = 5:95 | LiFSI | 0.9 | LiPF$_6$ | 0.15 | 6.0 |
| Embodiment 41 | EC:EMC = 5:95 | LiFSI | 0.9 | LiPF$_6$ | 0.25 | 3.6 |
| Embodiment 42 | EC:EMC = 5:95 | LiFSI | 0.9 | LiPF$_6$ | 0.3 | 3.0 |
| Embodiment 43 | EC:EMC = 5:95 | LiFSI | 0.9 | LiPF$_6$ | 0.35 | 2.6 |
| Embodiment 44 | EC:EMC = 5:95 | LiFSI | 0.9 | LiPF$_6$ | 0.4 | 2.3 |
| Embodiment 45 | EC:EMC:DEC = 20:60:20 | LiFSI | 1.1 | LiPF$_6$ | 0.2 | 5.5 |
| Embodiment 46 | EC:EMC:DEC = 15:65:20 | LiFSI | 1.1 | LiPF$_6$ | 0.2 | 5.5 |
| Embodiment 47 | EC:EMC = 10:90 | LiFSI | 1.1 | LiPF$_6$ | 0.2 | 5.5 |
| Embodiment 48 | EC:EMC:DMC = 5:85:10 | LiFSI | 1.1 | LiPF$_6$ | 0.2 | 5.5 |
| Comparative Embodiment 8 | EC:EMC:DMC = 30:50:20 | LiFSI | 1.1 | LiPF$_6$ | 0.2 | 5.5 |
| Comparative Embodiment 9 | EC:EMC = 30:70 | LiFSI | 1.1 | LiPF$_6$ | 0.2 | 5.5 |
| Comparative Embodiment 10 | EC:EMC = 5:95 | / | / | LiPF$_6$ | 1.2 | / |
| Comparative Embodiment 11 | EC:EMC = 5:95 | LiFSI | 0.5 | LiPF$_6$ | 0.8 | 0.6 |
| Comparative Embodiment 12 | EC:EMC = 5:95 | LiFSI | 1.25 | LiPF$_6$ | 0.15 | 8.3 |
| Comparative Embodiment 13 | EC:EMC = 5:95 | LiFSI | 1.2 | LiPF$_6$ | 0.1 | 12.0 |
| Comparative Embodiment 14 | EC:EMC = 5:95 | LiFSI | 0.8 | LiPF$_6$ | 0.5 | 1.6 |

The following describes a test process of the secondary battery.

(1) Testing High-Temperature Cycle Performance

Charging the secondary battery under 45° C. at a constant current rate of 1 C until the voltage reaches 4.25 V, then charging the battery at a constant voltage of 4.25 V until the current drops to 0.05 C, and leaving the battery to stand for 5 minutes; and then discharging the battery to a lower-limit cut-off voltage (in the embodiments and comparative embodiments shown in Table 1, the lower-limit cut-off voltage is 2.8 V; in the embodiments and comparative embodiments shown in Table 2, the lower-limit cut-off voltage is 2.5 V) at a constant current rate of 1 C, thereby completing a first charge-discharge cycle of the secondary battery, where a discharge capacity at the end of the first cycle is a first-cycle discharge capacity of the secondary battery; performing 800 cycles of charge/discharge of the secondary battery according to the foregoing method to obtain a discharge capacity of the secondary battery after 800 cycles.

Capacity retention rate (%) of the secondary battery after 800 cycles under 45° C.=discharge capacity of the secondary battery after 800 cycles/discharge capacity of the secondary battery after the first cycle×100%.

(2) Testing High-Temperature Storage Performance

Charging the secondary battery under 60° C. at a constant current rate of 0.5 C the voltage reaches 4.25 V, and then charging the battery at a constant voltage of 4.2 V until the current drops to 0.05 C; measuring the volume of the lithium-ion battery at this time by using a drainage method, and recording a result as V0; putting the secondary battery into an 60° C. thermostat, keeping it stored for 30 days, and then taking it out; and measuring the volume of the secondary battery at this time, and recording a result as V2.

Volume expansion rate of the secondary battery after storage under 60° C. for 30 days (%)=[(V2−V1)/V1]×100%.

TABLE 3

Performance test results of Embodiments 1-24 and Comparative Embodiments 1-7

| Serial number | Capacity retention rate (%) after 800 cycles under 45° C. | Volume expansion rate (%) after storing for 30 days under 60° C. |
|---|---|---|
| Embodiment 1 | 83.1 | 9.45 |
| Embodiment 2 | 83.0 | 9.37 |
| Embodiment 3 | 83.6 | 9.12 |
| Embodiment 4 | 84.9 | 8.71 |
| Embodiment 5 | 84.2 | 8.34 |
| Embodiment 6 | 83.9 | 8.37 |
| Embodiment 7 | 80.5 | 8.41 |
| Embodiment 8 | 81.5 | 9.63 |
| Embodiment 9 | 82.1 | 9.07 |
| Embodiment 10 | 82.0 | 10.07 |
| Embodiment 11 | 80.6 | 10.35 |
| Embodiment 12 | 84.5 | 9.99 |
| Embodiment 13 | 83.9 | 9.09 |
| Embodiment 14 | 83.2 | 9.38 |
| Embodiment 15 | 81.7 | 9.72 |
| Embodiment 16 | 82.9 | 8.99 |
| Embodiment 17 | 82.5 | 9.25 |
| Embodiment 18 | 82.2 | 9.37 |
| Embodiment 19 | 81.5 | 9.72 |

TABLE 3-continued

Performance test results of Embodiments 1-24 and Comparative Embodiments 1-7

| Serial number | Capacity retention rate (%) after 800 cycles under 45° C. | Volume expansion rate (%) after storing for 30 days under 60° C. |
| --- | --- | --- |
| Embodiment 20 | 82.4 | 9.95 |
| Embodiment 21 | 81.5 | 12.84 |
| Embodiment 22 | 80.1 | 11.94 |
| Embodiment 23 | 82.9 | 10.95 |
| Embodiment 24 | 83.1 | 9.82 |
| Comparative Embodiment 1 | 74.5 | 17.14 |
| Comparative Embodiment 2 | 76.9 | 15.65 |
| Comparative Embodiment 3 | 80.1 | 12.76 |
| Comparative Embodiment 4 | 75.0 | 21.26 |
| Comparative Embodiment 5 | 72.5 | 12.57 |
| Comparative Embodiment 6 | 73.7 | 16.17 |
| Comparative Embodiment 7 | 76.8 | 19.59 |

TABLE 4

Performance test results of Embodiments 25-48 and Comparative Embodiments 8-14

| Serial number | Capacity retention rate (%) after 800 cycles under 45° C. | Volume expansion rate (%) after storing for 30 days under 60° C. |
| --- | --- | --- |
| Embodiment 25 | 80.1 | 11.42 |
| Embodiment 26 | 80.1 | 11.35 |
| Embodiment 27 | 80.6 | 11.10 |
| Embodiment 28 | 82.1 | 10.68 |
| Embodiment 29 | 81.3 | 10.32 |
| Embodiment 30 | 80.9 | 10.35 |
| Embodiment 31 | 77.8 | 10.38 |
| Embodiment 32 | 78.3 | 11.59 |
| Embodiment 33 | 79.6 | 11.04 |
| Embodiment 34 | 78.9 | 12.03 |
| Embodiment 35 | 77.6 | 12.31 |
| Embodiment 36 | 81.9 | 11.99 |
| Embodiment 37 | 81.3 | 11.07 |
| Embodiment 38 | 80.5 | 11.34 |
| Embodiment 39 | 78.5 | 11.67 |
| Embodiment 40 | 80.1 | 10.95 |
| Embodiment 41 | 79.2 | 11.21 |
| Embodiment 42 | 78.9 | 11.33 |
| Embodiment 43 | 78.1 | 11.67 |
| Embodiment 44 | 79.1 | 11.91 |
| Embodiment 45 | 78.1 | 14.80 |
| Embodiment 46 | 77.3 | 13.90 |
| Embodiment 47 | 80.1 | 12.89 |
| Embodiment 48 | 79.7 | 11.77 |
| Comparative Embodiment 8 | 70.1 | 20.10 |
| Comparative Embodiment 9 | 73.5 | 18.60 |
| Comparative Embodiment 10 | 76.1 | 15.70 |
| Comparative Embodiment 11 | 71.8 | 24.21 |
| Comparative Embodiment 12 | 68.2 | 15.52 |
| Comparative Embodiment 13 | 69.5 | 20.12 |
| Comparative Embodiment 14 | 72.5 | 23.15 |

As can be learned from analysis of the test results in Table 3 and Table 4, with Embodiments 1-24 compared to Comparative Embodiments 1-7, and with Embodiments 25-48 compared to Comparative Embodiments 8-14, the electrolyte salt in Embodiments 1-48 according to this application includes the LiFSI and the $LiPF_6$, the volumetric molar concentration of the LiFSI in the electrolytic solution is 0.8 mol/L-1.2 mol/L, the volumetric molar concentration of the $LiPF_6$ in the electrolytic solution is 0.15 mol/L-0.4 mol/L, the organic solvent includes the EC, and the mass percent of the EC in the organic solvent is less than or equal to 20%. Under common action of the electrolyte salt and the organic solvent, the secondary battery according to this application achieves good high-temperature cycle performance and good high-temperature storage performance at the same time. However, when the secondary battery does not meet the foregoing conditions specified in this application, with Comparative Embodiments 1-7 compared to Embodiments 1-24, and with Comparative Embodiments 8-14 compared to Embodiments 25-48, the high-temperature cycle performance and the high temperature storage performance cannot keep on a relatively high level at the same time.

What is claimed is:

1. A secondary battery, comprising an electrolytic solution, wherein the electrolytic solution comprises an electrolyte salt and an organic solvent;
   the electrolyte salt comprises lithium bis(fluorosulfonyl) imide, LiFSI, and lithium hexafluorophosphate, $LiPF_6$;
   a volumetric molar concentration of the LiFSI in the electrolytic solution is 0.9 mol/L-1.2 mol/L;
   a volumetric molar concentration of the $LiPF_6$ in the electrolytic solution is 0.15 mol/L-0.4 mol/L;
   a ratio of the volumetric molar concentration of the LiFSI to the $LiPF_6$ is 4-6:1; and
   the organic solvent comprises ethylene carbonate, EC, and mass percent of the EC in the organic solvent is less than or equal to 10%.

2. The secondary battery according to claim 1, wherein the volumetric molar concentration of the $LiPF_6$ in the electrolytic solution is 0.15 mol/L-0.3 mol/L.

3. The secondary battery according to claim 1, wherein the organic solvent further comprises one or more of dimethyl carbonate, DMC, diethyl carbonate, DEC, or ethyl methyl carbonate, EMC.

4. The secondary battery according to claim 1, wherein the organic solvent further comprises the EMC, and a mass percent of the EMC in the organic solvent is 60%-95%.

5. The secondary battery according to claim 1, wherein the electrolytic solution further comprises an additive, and the additive comprises one or more of fluoroethylene carbonate, FEC, ethylene sulfate, DTD, 1,3-propane sultone, PS, 1,3-propenyl-sultone, PST, succinic anhydride, SA, lithium difluorooxalate borate, LiDFOB, lithium difluorobisoxalate phosphate, LiDFOP, tris(trimethylsilyl)phosphate, TMSP, or tris(trimethylsilyl)borate, TMSB.

6. The secondary battery according to claim 1, wherein a conductivity of the electrolytic solution at 25° C. is 6.5 mS/cm-9.5 mS/cm.

7. The secondary battery according to claim 1, wherein a volumetric molar concentration of the electrolyte salt in the electrolytic solution is 1.0 mol/L-1.4 mol/L.

8. The secondary battery according to claim 1, wherein the secondary battery comprises a negative electrode plate, the negative electrode plate comprises a negative electrode current collector and a negative electrode membrane that is disposed on at least one surface of the negative electrode current collector and that comprises a negative electrode active material, and the negative electrode active material comprises a carbon material or a silicon-based material or both thereof.

9. The secondary battery according to claim 8, wherein the negative electrode active material comprises the silicon-based material, and a weight percent of the silicon-based material in the negative electrode active material is less than or equal to 40%.

10. The secondary battery according to claim 1, wherein the secondary battery comprises a positive electrode plate, the positive electrode plate comprises a positive electrode current collector and a positive electrode membrane that is disposed on at least one surface of the positive electrode current collector and that comprises a positive electrode active material, and the positive electrode active material comprises a lithium nickel cobalt manganese oxide or a lithium nickel cobalt aluminum oxide or both thereof.

11. The secondary battery according to claim 10, wherein the positive electrode active material further comprises one or more of a lithium nickel oxide, a lithium manganese oxide, a lithium iron phosphate, a lithium manganese phosphate, a lithium iron manganese phosphate, a lithium cobalt oxide, or a modified compound thereof.

12. An apparatus, wherein the apparatus comprises the secondary battery according to claim 1.

13. The secondary battery according to claim 1, wherein the electrolytic solution further comprises an additive, and the additive comprises one or more of ethylene sulfate, DTD, 1,3-propenyl-sultone, PST, lithium difluorooxalate borate, LiDFOB, lithium difluorobisoxalate phosphate, LiDFOP, tris(trimethylsilyl)phosphate, TMSP, or tris(trimethylsilyl) borate, TMSB.

* * * * *